July 1, 1924.

C. W. KIRSCH 1,499,985

SHEET STEEL ARTICLE AND METHOD OF MAKING SAME

Filed Feb. 4, 1924

Inventor.
Charles W. Kirsch
By Rudolph _____
Attorney

Patented July 1, 1924.

1,499,985

UNITED STATES PATENT OFFICE.

CHARLES W. KIRSCH, OF STURGIS, MICHIGAN, ASSIGNOR TO KIRSCH MANUFACTURING COMPANY, OF STURGIS, MICHIGAN, A CORPORATION OF MICHIGAN.

SHEET-STEEL ARTICLE AND METHOD OF MAKING SAME.

Application filed February 4, 1924. Serial No. 690,518.

*To all whom it may concern:*

Be it known that I, CHARLES W. KIRSCH, a citizen of the United States, residing at Sturgis, in the county of St. Joseph and State of Michigan, have invented certain new and useful Improvements in Sheet-Steel Articles and Methods of Making Same, of which the following is a specification.

This invention has for its primary object to produce at less cost than heretofore certain paint-enameled sheet-steel articles possessing the novel and highly advantageous characteristics hereinafter fully set forth.

The manufacture of certain paint-enameled sheet-metal articles such for example, as curtain rods and articles adapted to be rolled rather than pressed into form, includes the several steps of first cutting a sheet of metal, either plain or lightly tinned or copper-plated, into strips or blanks, then forming or shaping said strips; then "pickling" the same in a chemical solution, such as a caustic-soda solution; then rinsing and drying the same; then applying a coat of paint-enamel thereto; then baking the same, and thereafter applying a second coat of paint enamel and again baking the same.

The invention is particularly intended and adapted for the manufacture of curtain rods and drapery hardware and will be described in accordance with my experience in and its adaptation to that specific art.

It is desirable that curtain rods, particularly, shall possess the greatest possible degree of rigidity consistent with low cost and light weight, in order that sagging thereof under the weight of the curtains or draperies suspended therefrom, may not occur, and my invention therefore has for its primary object to produce sheet-metal adapted for the manufacture of curtain rods and the like, which will increase the rigidity while decreasing the weight and cost of the rods.

It is also necessary that the said rods be rendered absolutely rust-proof and present a most attractive appearance when finished, and that the finish shall be very durable. It is accordingly another very important object of my invention to produce a more attractive article possessing greater durability than heretofore and costing far less in point of finish, so that the total economies effected, from start to completion of the article, are very appreciable, and the finished product possesses several distinct advantages over articles of the same class as now produced.

The invention resides in the method and product hereinafter fully described and claimed.

In the accompanying drawings, I have illustrated the invention, in so far as it relates to the product, as embodied in curtain rods as exemplary of a general class or type of article to which it is adapted.

Figure 1:
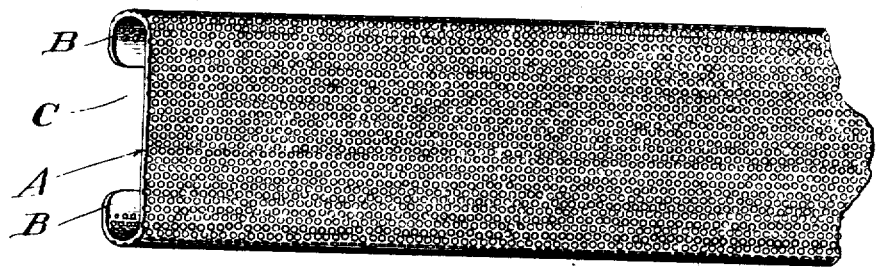
Fig. 1 is a fragmentary perspective view of a curtain rod made in accordance with the invention.

The curtain rod illustrated is of the popular flat type consisting of a flat strip A of metal having parallel overturned side flanges B, the free edges of which are spaced from the middle or body-portion A to provide a hollow or substantially tubular structure, and are spaced from each other to provide a continuous open slot C which, when the rod is positioned for performance of its function, is disposed rearwardly of the portion A and opposes the window-casing or the like.

Reference is had to my copending application for Letters Patent for metal forming machine, filed August 9, 1923, Serial No. 656,560, to illustrate the preferred method of forming the said rods, and as exemplary of means adapted for the forming of other sheet-metal articles as distinguished from the use of dies.

This type of rod illustrated possesses a considerable degree of rigidity and has been made of open-hearth sheet-steel of a certain temper and approximating or averaging 20/1000 inch thickness, as best adapted for the purpose from the standpoint of cost and weight. The temper of the metal has been the maximum in degree permitting the forming without having the metal spring back, more or less, to an extent detrimental to uniformity of shape in cross-section and difficulty in handling in the forming tools or devices. The temper is necessary to sufficient rigidity longitudinally of the rod and is disadvantageous in other respects. It is, therefore, very desirable and advantageous to employ sheet-metal which is less elastic than that heretofore used and without being less rigid or of greater weight.

In carrying out my present invention, the first step consists in reducing the resiliency of the metal while increasing its hardness to thereby better adapt it to forming, on the one hand, and increasing its rigidity on the other. This is effected by first passing the strips of metal to be shaped or formed, between the rolls 1 and 2, one of said rolls having surface projections 3 and constituting a male-die element, and the other thereof having corresponding surface recesses or depressions 4 and constituting the female-die element. The projections 3 have rounded or convex crown portions, the bases thereof meeting the roll-surface preferably in minute fillets 5 to engage the face of the plate in opposition to the intervening high portions of the recessed roll 9, the latter being arranged to engage the opposite surface of the plate. The recesses or depressions 4 of the roll 2 may and preferably do possess sharp rims or edges. The resulting sheet metal presents a flat pitted face or surface and a correspondingly puckered face or surface, both, in point of general appearance and in dimensions of recesses or pits and projections, and close grouping of the same, resembling the coarser type of textiles, such as towelings, for example. Pitting and puckering as shown is merely exemplary of a means for slightly increasing the gross cross-sectional dimension of the metal and producing on the faces thereof minute, closely spaced hollows and raised portions, respectively.

The surfaces of the rolls 1 and 2 from which the projections 3 rise and into which the recesses 4 are cut, respectively, are cylindrical so as to maintain the surfaces of the sheet-metal between the pits and puckers in a flat condition.

The action of each pair of said recesses 4 and projections 3 of the rolls on the interposed metal strip, is substantially that of drawing the metal. The said recesses and projections are very minute and closely grouped as above pointed out so that the surface of the strip containing the pits or depressions D, presents in the instance illustrated, an appearance somewhat similar to that of an egg-shell, the depressions being visible and tangibly appreciable. In this operation owing to the stretch of the metal of the depressed portions and the compression of the body of the sheet between the depressions, the metal strip becomes appreciably elongated as well as having its maximum thickness, between the surface containing the depressions D and the crowns of the projections E of the other face thereof, increased. Its resiliency is materially decreased while its hardness is apparently increased. Its condition is now such with respect to resiliency, that it lends itself more readily to forming and, with respect to hardness, that it imparts greater rigidity to the rod formed therefrom.

I am thus enabled to and do use stock of somewhat greater temper than heretofore and of approximately 18/1000 inch thickness, thereby economizing in original weight of raw material and gaining, in addition thereto, the amount of metal resulting from elongation.

Figure 2:
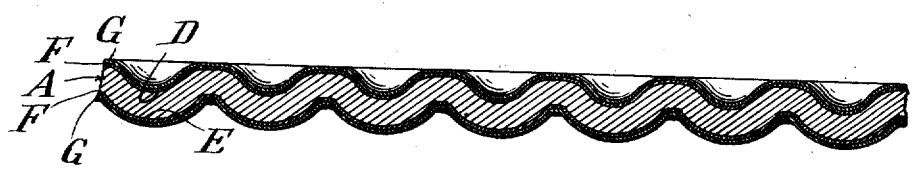
Fig. 2 is a section of the same many times enlarged, the section being taken on any line longitudinally, transversely or diagonally of Fig. 1.
Figure 3:
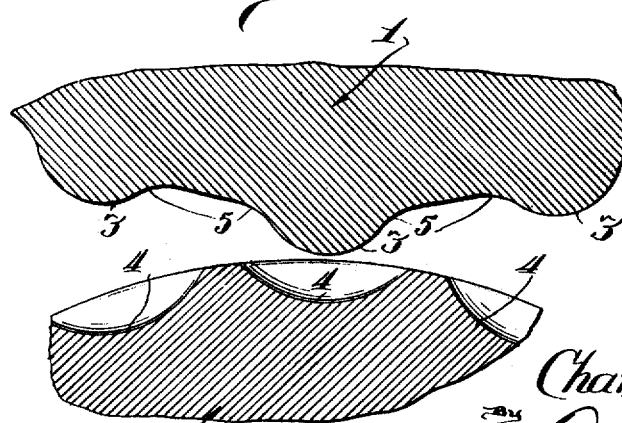
Fig. 3 is a greatly enlarged fragmentary section of rollers employed for treating sheet metal for curtain rods, etc.

I preferably employ a lightly tinned stock because this can be stored in greater quantity without rusting and further, because the non-corrosive metal coating F indicated in Fig. 2, constitutes a permanent aid to the rust-proofness of the finished product attained by the paint-enamel surfacing. It is also advantageous in respect to the adhesion of the paint-enamel coating.

After treatment by the rolls 1 and 2 as aforesaid, and then forming, the rods are ready to receive the paint-enamel surfacing without requiring the pickling, rinsing, and drying heretofore necessary, the cost of said operations, the time required therefor and the space for the equipment (besides the cost of the latter) being saved. The purpose of the pickling is to chemically produce microscopic pits in the surface to rob it of the smoothness inherent therein as received from the mill, it being impossible to secure adhesion of the paint enamel without such pitting, the latter being, however, so slight as not to be tangibly appreciable to the touch, the metal remaining practically as smooth to the touch as prior to the pickling but presenting a dull appearance in place of the original polish.

The paint-enamel is most commonly sprayed upon the surface as this is the quickest, best and most economical. In spraying the paint-enamel on the still very smooth metal surface, a very large percentage of the material bounds off into the recovery vats and it is found that many minute surface portions of the metal are not covered. This necessitates the application of a second coat because these minute uncovered surface portions will soon develop rust spots. Thus, after baking the first coat, the second coat is applied and the baking repeated. Careful inspection shows that a considerable percentage of the articles still present these minute uncovered surface portions and, because a third coat is impracticable for various reasons, these defective articles must be completely decoated and refinished at very considerable cost. To eliminate this cost and obtain a perfectly coated article by the application of only one coat of paint-enamel, is obviously of tremendous advantage and this I accomplish by the aforesaid treatment, thereby also saving the cost of the second coat and the labor, time and additional factory space incident thereto.

After being formed, the rods or other articles are taken directly into the paint-shop and the paint-enamel applied by means of atomizers or "air brushes," as they are sometimes called. Forced projection of the paint-enamel on the surface is very essential to its adhesion and also causes a flattening out of the microscopic globules so that they overlap and pile up to effect complete coating. In practice, I have found it necessary to reduce the flow of the paint-enamel from the atomizer or air brush to about sixty per cent of that necessary to the coating of the smooth surfaced articles, as otherwise "flooding" results which mitigates against absolute smoothness. This is most probably due to the fact that only a very small percentage of the enamel bounds off into the recovery vats because the tangibly appreciable unevenness or roughness of the surface, catches and holds the enamel. The total paint, labor and space economies effected are enormous. Furthermore, most careful inspection has demonstrated conclusively that an uncovered surface portion is so rare as to be negligible and is obviated by the application of a very thin second coat, either locally or over the whole article.

It is essential that the paint-enamel used be of the type which is not brittle when dry, and I prefer to employ that type which contains cellulose or a vegetable gum and is, preferably, of a type that will bear baking.

It is also obvious that exposed sharp metal edges will, upon application of pressure or friction, cut through the coating of enamel very quickly and it is, therefore, very essential that exposed surfaces or high points shall be flat or rounded instead of being sharp.

The application of the paint-enamel by means of the air brush or atomizer is preferable to the use of hair brushes or dipping because brushes tend to apply too much in the recesses and too little on the high points, and in dipping, the forced contact and thin spread of the liquid is not obtained. Furthermore, both said methods are far slower than the air brush.

The particular pattern illustrated is merely exemplary of a suitable and very attractive means for obtaining the desired results, it being quite obvious that any pattern or design that will impart minute rounded or flat high points devoid of sharp edges, will be equally as well adapted to the purpose.

From the foregoing it will be obvious that the economies in cost of manufacture are very comprehensive while the resulting product is superior in point of mechanical excellence and appearance to that heretofore produced. The mechanical treatment of the metal as above described produces far better results than the pickling at less cost. It is also well known that if the rinsing, following pickling, is not very thoroughly accomplished, traces of the chemical remaining on the metal will cause rust spots and peeling of the paint-enamel.

From the foregoing it will be apparent that the invention is very comprehensive in its mechanical aspects as regards resulting structural characteristics of the product and adhesion and consequent durability of the finish and in respect to improved appearance and the several economies effected.

"Pitted and puckered" as hereinbefore used and set forth in the claims shall be construed to define not only the particular treatment or formations illustrated but any other form or forms serving to produce minute and closely grouped or spaced ridges and recesses possessing the characteristics substantially as hereinbefore defined.

I claim as my invention:—

1. A sheet-steel article such as a channeled strip or the like made from a blank normally too resilient to be adapted for forming into said articles to adapt the latter to maintain their shapes under loads or stresses for which they are intended, said blank being bodily distorted to present minutely pitted and puckered surfaces and possessing suitably reduced resiliency and thereby adapted for shaping as aforesaid, to produce said articles.

2. A sheet-steel article such as a channeled strip or the like made from a blank normally insufficiently rigid for forming into such articles to adapt the latter to maintain their shapes under normal loads or stresses for which they are intended, said blank being bodily distorted to present minutely pitted and puckered surfaces and possessing suitably increased rigidity and thereby adapted for shaping as aforesaid to produce said articles.

3. A sheet-steel metal article such as a channeled strip or the like made from a blank normally too resilient and insufficiently rigid for forming into such articles to render them capable of maintaining their normal shapes under loads or stresses for which they are intended, said blank being bodily distorted to present minutely pitted and puckered surfaces and possessing suitably reduced resiliency and increased hardness and thereby adapted for shaping as aforesaid to form said article.

4. A sheet-metal article such as a channeled strip or the like, made from a blank normally unsuited for forming into such articles to render them capable of bearing loads and stresses for which they are intended without distortion, said blank bodily distorted and increased in area to present minutely pitted and puckered surfaces and thereby adapted for shaping as aforesaid into such articles.

5. A sheet-steel article such as a channeled strip or the like made from a blank coated with a rust-proof metal and normally unsuited for shaping into such articles to render them capable of bearing loads and stresses for which they are intended and incapable of permanently retaining a coating of paint-enamel without chemical treatment before applying said coating, said blank bodily distorted to present minutely pitted and puckered surfaces and thereby adapted for shaping into said articles and for permanently retaining a coating of paint enamel without other treatment.

6. A sheet-steel article such as a channeled strip or the like, made from a blank coated with a rust-proof metal and normally unsuited for shaping into such articles to render them capable of bearing loads and stresses for which they are intended, and incapable of permanently retaining a coating of paint-enamel without chemical treatment before applying said coating, said blank bodily distorted and increased in normal dimension to present minute closely associated surface distortions and thereby adapted for shaping into said articles and for permanently retaining paint-enamel without other treatment.

7. A sheet-metal article such as a channeled strip or the like, made from a blank having substantially rust-proof metallic surfaces and normally unsuited for forming into such articles to render them capable of bearing load or stress for which the same are intended and incapable of permanently retaining a coating of paint enamel without preliminary chemical treatment, said blank bodily distorted to present minutely closely associated surface distortions and thereby adapted for shaping into said articles and to permanently retain a coating of paint-enamel without other treatment.

8. A sheet-metal article such as a channeled strip or the like made from a blank having surfaces normally incapable of permanently retaining a coating of paint enamel without preliminary chemical treatment and normally unsuited for forming into such articles to render them capable of bearing load or stress for which the same are intended, said blank bodily distorted to present minute, closely associated surface distortions and thereby adapted for shaping into said articles and for permanently retaining a coating of paint enamel without other treatment.

9. A sheet-steel article such as a channeled strip or the like, made from a blank coated with a rust-proof metal and normally too resilient for forming into said articles to render them capable of bearing load and stress for which the same are intended and incapable of permanently retaining a coating of paint enamel without preliminary chemical treatment, said blank bodily distorted to present minute, closely associated surface distortions and thereby suitably reduced in resiliency to adapt the same for shaping into said articles and thereby also adapted for permanently retaining a coating of paint enamel without other preliminary treatment.

10. A sheet-steel article such as a channeled strip or the like made from a blank coated with a rust-proof metal and normally insufficiently rigid for forming into such articles to render them capable of bearing load and stress for which the same are intended and incapable of permanently retaining a coating of paint-enamel without preliminary chemical treatment, said blank bodily distorted to present minute, closely associated surface distortions and thereby suitably increased in rigidity to adapt the same for shaping into said articles and thereby also adapted for permanently retaining a coating of paint enamel without other preliminary treatment.

11. As a new article of manufacture, a sheet metal channeled strip or the like formation having throughout the extent thereof multitudinous closely associated distortions or rearrangements of the metal forming longitudinal transverse and diagonal undulatory cross sections therein to create added rigidity and strength in all directions throughout the formation.

12. As a new article of manufacture, a sheet metal channeled strip or the like including in a part a fold or bend and having throughout the bend or folded portion thereof distortions or rearrangements of the metal constituting undulatory lines of resistance tending to maintain the associated parts in their bent or folded relation.

13. As a new article of manufacture, a sheet metal channeled strip or the like having throughout substantially the extent thereof multitudinous closely associated distortions or rearrangements of the metal to normally present surface formations and create added rigidity and strength in all directions throughout the formation.

14. As a new article of manufacture, a channeled strip or the like formed of sheet-metal coated with a rust-proof metal normally incapable of permanently retaining a coating of paint-enamel without preliminary chemical treatment, said strip having throughout substantially the extent thereof multitudinous closely associated distortions or rearrangements of the metal to create added rigidity and strength in all directions throughout the strip and adapted to receive and permanently retain a coating of paint-enamel without preliminary chemical treatment.

15. As a new article of manufacture, a channeled strip or the like formed of sheet-steel coated with a rust-proof metal normally incapable of permanently retaining a coating of paint-enamel without preliminary chemical treatment, said strip having throughout substantially the extent thereof multitudinous closely associated distortions or rearrangements of the metal to create added rigidity and strength in all directions throughout the strip and bearing a permanent coating of paint-enamel applied thereto without preliminary chemical treatment.

16. The method of making a shaped article, such as a channeled strip, from a metal sheet, the characteristics of which are not well suited for the purpose, which consists in initially subjecting the sheet to manipulation to distort or rearrange the normal structure thereof to normally present surface formations and create throughout the sheet a substantially increased rigidity while preserving substantially plane faces, then forming the sheet to produce the shape of article desired.

17. The method of making a shaped article from a metal sheet which is normally too flexible or resilient for the purpose for which it is to be used, which consists in initially subjecting the sheet to manipulation to distort or rearrange the normal structure thereof, thereby creating throughout the sheet a substantially reduced resiliency and increased rigidity, and to present minute surface formations, then forming the sheet to produce the shape of article desired, utilizing the initial distorting of the structure to resist tendency to change from such shape.

18. The method of treating a metal sheet which is normally too flexible or resilient for the purpose for which it is to be used, which consists in initially subjecting the sheet to manipulation to distort or rearrange the normal structure thereof and thereby create throughout the sheet a substantially reduced resiliency and increased rigidity and to present surface formations thereon.

19. The method of treating a metal sheet which is normally unsuited to be readily bent and preserved in a shaped formation, which consists in subjecting the sheet to manipulation to distort or rearrange the normal structure thereof and thereby create throughout the sheet a substantially increased capability of being bent and maintaining a shaped condition and to present surface formations thereon.

20. The method of making a shaped article from sheet metal which consists in initially subjecting the sheet of metal to manipulation to distort or rearrange portions of the normal structure thereof, and to present surface formations thereon, then bending the sheet at said portions to produce the shaped article, utilizing the distorting of the sheet to assist in maintaining such shape at the bends or folds.

21. The method of making a shaped article from sheet metal which consists in initially subjecting the sheet of metal to manipulation to distort or rearrange substantially the entire normal structure thereof to present surface formations, then bending the sheet to produce the shaped article, utilizing the distorting of the sheet to assist in maintaining such shape at the bends or folds and to create an increased rigidity throughout the body of the sheet.

22. As a new article of manufacture, a sheet-steel article composed of sheet-steel coated with a rust-proof metal normally incapable of permanently retaining a coating of paint enamel without preliminary chemical treatment, said metal presenting minute, closely associated surface distortions and thereby adapted to permanently retain a coating of paint enamel without preliminary chemical treatment.

23. As a new article of manufacture, a sheet-metal article composed of at least in part a metal normally incapable of permanently retaining a coating of paint enamel without preliminary chemical treatment, said metal presenting minute, closely associated surface distortions and thereby adapted to permanently retain a coating of paint enamel without preliminary chemical treatment.

24. As a new article of manufacture, a sheet-metal article composed at least in part of a metal normally incapable of permanently retaining a coating of paint enamel without preliminary chemical treatment, said metal presenting minute, closely associated surface distortions presenting exposed surfaces in substantially all directions and thereby adapted to permanently retain a coating of paint enamel without preliminary chemical treatment.

25. The method of making permanently paint enameled sheet metal articles without chemical treatment of the surfaces thereof preliminary to applying the paint enamel, which consists in first mechanically treating a sheet of metal to produce minute multitudinous closely associated surface distortions thereof, then shaping the metal into the desired article, and thereafter and without other preliminary treatment of the surface thereof, applying a coating of paint enamel thereto.

26. The method of making permanently paint enameled sheet metal articles without chemical treatment of the surfaces thereof preliminary to applying the paint enamel, which consists in first mechanically treating a sheet of metal to produce minute multitudinous closely associated surface distortions thereof devoid of sharp edges, then shaping the metal into the desired article, and thereafter and without other preliminary treatment of the surfaces thereof, applying a coating of paint enamel thereto.

27. The method of preparing sheet metal normally unsuited for shaping into certain articles, to adapt the same for said purpose and at the same time adapt the same to permanently retain a coating of paint enamel without preliminary chemical treatment, which consists in elongating the metal and distorting the surfaces thereof to provide multiudinous minute, closely associated surface formations thereon devoid of sharp edges.

28. The method of preparing sheet metal normally unsuited for shaping into certain articles, to adapt the same for said purpose and at the same time adapt the same to permanently retain a coating of paint enamel without preliminary chemical treatment, which consists in elongating the metal and distorting the body of the metal to provide multitudinous minute, closely associated surface formations thereon devoid of sharp edges, said distortion decreasing the normal resiliency and increasing the rigidity of the metal.

CHARLES W. KIRSCH.